United States Patent
Park et al.

(10) Patent No.: US 10,535,847 B2
(45) Date of Patent: *Jan. 14, 2020

(54) SECONDARY BATTERY HAVING POUCH TYPE EXTERIOR MEMBER WITH FOLDED SEALING PART

(71) Applicant: LG Chem, Ltd., Seoul (KR)

(72) Inventors: Jun-Kyu Park, Jeollabuk-do (KR); Hyun-Woo Park, Daejeon (KR); Kyung-Min Lee, Daejeon (KR); Jeong-Ah Lee, Daejeon (KR); Jae-Ho Um, Daejeon (KR)

(73) Assignee: LG Chem, Ltd. (KR)

( * ) Notice: Subject to any disclaimer, the term of this patent is extended or adjusted under 35 U.S.C. 154(b) by 169 days.

This patent is subject to a terminal disclaimer.

(21) Appl. No.: 15/869,585

(22) Filed: Jan. 12, 2018

(65) Prior Publication Data

US 2018/0138470 A1 May 17, 2018

Related U.S. Application Data

(63) Continuation of application No. 14/372,240, filed as application No. PCT/KR2014/002391 on Mar. 21, 2014, now Pat. No. 9,911,949.

(30) Foreign Application Priority Data

Mar. 22, 2013 (KR) .......................... 10-2013-0031062

(51) Int. Cl.
*H01M 2/08* (2006.01)
*H01M 2/02* (2006.01)
(Continued)

(52) U.S. Cl.
CPC ............... *H01M 2/08* (2013.01); *H01M 2/02* (2013.01); *H01M 2/0202* (2013.01);
(Continued)

(58) Field of Classification Search
CPC ........ H01M 2/0212; H01M 2/08; H01M 2/30; H01M 2/0237; H01M 2/0202; H01M 2/02; H01M 10/052
(Continued)

(56) References Cited

U.S. PATENT DOCUMENTS 6,451,476 B1 9/2002 Chang et al.
9,911,949 B2 * 3/2018 Park .................... H01M 2/0212
(Continued)

FOREIGN PATENT DOCUMENTS

JP 2001250516 A 9/2001
JP 2001256933 A 9/2001
(Continued)

OTHER PUBLICATIONS

Extended Search Report from European Application No. 14736592.8, dated Oct. 15, 2015.
(Continued)

*Primary Examiner* — Sean P Cullen
(74) *Attorney, Agent, or Firm* — Lerner, David, Littenberg, Krumholz & Mentlik, LLP

(57) ABSTRACT

There is provided a secondary battery including an electrode assembly having a stack structure of an anode/a separation film/a cathode, a pouch type exterior member configured of a lower surface in which a receiving part is formed and an upper surface covering the receiving part, a single electrode assembly or a plurality of electrode assemblies being received in the receiving part, and an electrode terminal formed outwardly of the pouch type exterior member, the secondary battery including: a sealing part formed by bonding edges of the pouch type exterior member, wherein a portion of the sealing part formed on a surface of the pouch type exterior member on which the electrode terminal is not
(Continued)

formed outwardly of the exterior member is folded downwardly at an angle of 90 degrees.

14 Claims, 4 Drawing Sheets

(51) Int. Cl.
  *H01M 2/30* (2006.01)
  *H01M 10/052* (2010.01)
  *H01M 10/04* (2006.01)
  *H01M 10/0525* (2010.01)

(52) U.S. Cl.
  CPC ....... *H01M 2/0212* (2013.01); *H01M 2/0237* (2013.01); *H01M 2/30* (2013.01); *H01M 10/052* (2013.01); *H01M 10/0436* (2013.01); *H01M 10/0525* (2013.01); *H01M 2220/20* (2013.01); *H01M 2220/30* (2013.01)

(58) Field of Classification Search
  USPC .................. 429/156, 163, 178, 179, 185
  See application file for complete search history.

(56) References Cited

U.S. PATENT DOCUMENTS

| | | |
|---|---|---|
| 2001/0005561 A1 | 6/2001 | Yamada et al. |
| 2003/0054241 A1 | 3/2003 | Yamashita et al. |
| 2003/0162088 A1 | 8/2003 | Nakanishi et al. |
| 2005/0191549 A1 | 9/2005 | Kang et al. |
| 2006/0127756 A1 | 6/2006 | Seo |
| 2007/0196733 A1 | 8/2007 | Lee |
| 2007/0202398 A1 | 8/2007 | Kim |
| 2010/0003594 A1 | 1/2010 | Hong et al. |
| 2010/0035144 A1 | 2/2010 | Oh et al. |
| 2012/0258352 A1 | 10/2012 | Hong |
| 2013/0071696 A1 | 3/2013 | Kim et al. |
| 2013/0230767 A1 | 9/2013 | Pak et al. |
| 2015/0333375 A1 | 11/2015 | Kwon et al. |

FOREIGN PATENT DOCUMENTS

| | | |
|---|---|---|
| JP | 2002260602 A | 9/2002 |
| JP | 2006236857 A | 9/2006 |
| JP | 2007184273 A | 7/2007 |
| JP | 2008293999 A | 12/2008 |
| JP | 2009224147 A | 10/2009 |
| JP | 2010067423 A | 3/2010 |
| JP | 2015537338 A | 12/2015 |
| KR | 100956397 B1 | 5/2010 |
| KR | 101002468 B1 | 12/2010 |
| KR | 101108447 B1 | 2/2012 |

OTHER PUBLICATIONS

International Search Report for Application No. PCT/KR2014/002391 dated Jun. 26, 2014.

Mita et al., Machine translation of JP 2001-256933 A, Sep. 2001.

* cited by examiner

SECONDARY BATTERY HAVING POUCH TYPE EXTERIOR MEMBER WITH FOLDED SEALING PART

CROSS-REFERENCE TO RELATED APPLICATIONS

This application is a continuation of U.S. patent application Ser. No. 14/372,240, filed Jul. 15, 2014, which is a national phase entry under 35 U.S.C. § 371 of International Application No. PCT/KR2014/002391, filed Mar. 21, 2014, which claims priority to Korean Patent Application No. 10-2013-0031062, filed Mar. 22, 2013, the disclosures of which are incorporated herein by reference.

TECHNICAL FIELD

The present disclosure relates to a secondary battery and more particularly, to a pouch type secondary battery having improved energy density by significantly reducing an area occupied by a sealing part of a pouch.

BACKGROUND ART

Lithium ion secondary batteries may be classified as lithium ion batteries using liquid electrolytes and lithium ion polymer batteries using polymer solid electrolytes, depending on the types of electrolytes used therein.

In general, lithium ion secondary batteries using liquid electrolytes may be welded and sealed using a cylindrical or an angular metal can as a container, to be used. Since can-type secondary batteries using such a metal can as a container may have fixed forms, they may be disadvantageous in terms of restricting the designs of electrical products using such batteries as power sources, and reductions in the volumes of such electrical products may not be facilitated. Thus, pouch type secondary batteries formed by disposing and sealing two electrodes, a separation film, and an electrolyte in a pouch formed of a film have been developed and used.

A typical pouch for a lithium ion polymer battery has a multilayer structure formed by sequentially stacking a polyolefin layer, an aluminum layer, and a nylon layer. The polyolefin layer, an internal layer, has heat adhesion properties to function as a sealing member. The aluminum layer, a metal layer, provides mechanical strength and functions as a barrier layer against moisture and oxygen. The nylon layer, an external layer, functions as a base material and a protective layer.

Recently, rechargeable secondary batteries have been widely used as energy sources for wireless devices. In addition, secondary batteries have been prominent as power sources for electric vehicles (EVs), hybrid electric vehicles (HEVs), plug-in hybrid electric vehicles (PHEVs), and the like, such vehicles being intended to resolve atmospheric pollution and the like, due to existing gasoline vehicles, diesel vehicles and the like.

Further, in accordance with trends for the lightening and miniaturization of devices, secondary batteries used in the devices have been required to be light and to have thin structures. However, in pouch type exterior members according to the related art, in order to increase the safety of a secondary battery against the occurrence of a swelling phenomenon or gas during charging and discharging cycles of the secondary battery, a width of a sealing part may be relatively large. However, in a case in which the width of the sealing part is large, a battery module and a battery pack receiving the secondary battery may be enlarged, such that sizes of devices receiving the battery module and pack may also be increased.

DISCLOSURE

Technical Problem

An aspect of the present disclosure provides a secondary battery having improved energy density by significantly reducing a size of a sealing part to improve power output per unit volume.

An aspect of the present disclosure also provides a battery module and a battery pack receiving the secondary battery therein, the battery module and the battery pack having significantly reduced sizes.

Technical Solution

According to an aspect of the present disclosure, a secondary battery including an electrode assembly having a stack structure of an anode/a separation film/a cathode, a pouch type exterior member configured of a lower surface in which a receiving part is formed and an upper surface covering the receiving part, a single electrode assembly or a plurality of electrode assemblies being received in the receiving part, and an electrode terminal formed outwardly of the pouch type exterior member, may include: a sealing part formed by bonding edges of the pouch type exterior member, wherein a portion of the sealing part formed on a surface of the pouch type exterior member on which the electrode terminal is not formed outwardly of the exterior member is folded downwardly at an angle of 90 degrees.

The folded portion of the sealing part is adhered to a side surface of the secondary battery.

A width of the sealing part may be equal to or less than a thickness of the secondary battery.

The pouch type exterior member may have receiving parts formed in the upper and lower surfaces thereof.

The receiving parts formed in the upper and lower surfaces of the pouch type exterior member may be symmetrical with respect to each other.

A width of the sealing part may be equal to or less than half of a thickness of the secondary battery.

The receiving parts formed in the upper and lower surfaces of the pouch type exterior member may be asymmetrical with respect to each other.

A width of the sealing part may be equal to or less than a depth of the receiving part formed in a surface in which the depth of the receiving part is greater than that of the remaining receiving part formed in a remaining surface, from among the upper surface and the lower surface of the pouch type exterior member.

The portion of the sealing part may be folded at an angle of 90 degrees in a direction toward a surface in which the depth of the receiving part is greater than that of the remaining receiving part formed in the remaining surface, from among the upper surface and the lower surface of the pouch type exterior member.

The portion of the sealing part may be folded and fixed to one surface of the pouch type exterior member.

The portion of the sealing part may be folded and fixed to one surface of the pouch type exterior member by heat fusion or insulating tape.

An outermost portion of the insulating tape may be formed of a material selected from among a polyolefin polymer, a polyester polymer, and nylon.

The secondary battery may be a lithium ion battery or a lithium ion polymer battery.

According to another aspect of the present disclosure, there is provided a battery pack including two or more secondary batteries described above.

According to another aspect of the present disclosure, there is provided a device including at least one secondary battery described above, and the device may be a cellular phone, a portable computer, a smartphone, a smart pad, a net book computer, a light electric vehicle (LEV), an electric vehicle (EV), a hybrid electric vehicle (HEV), a plug-in hybrid electric vehicle (PHEV), or a power storage device.

Advantageous Effects

According to exemplary embodiments of the present disclosure, a sealing part of a pouch type secondary battery is folded downwardly at an angle of 90 degrees and is in a fixed state, such that a size of the sealing part may be significantly reduced to improve power output per unit volume. Correspondingly, energy density of the secondary battery may be improved.

In addition, volumes of a battery module and a battery pack receiving the secondary battery may be significantly decreased.

BEST MODE

Figure 1:
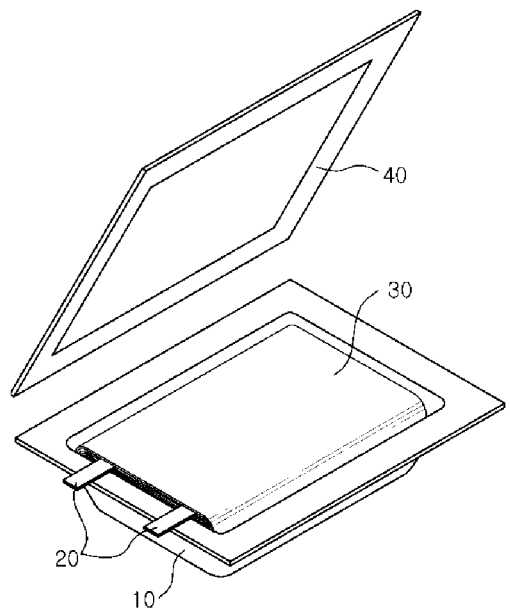
FIGS. 1 through 3 are exploded perspective views of a general pouch type secondary battery.
Figure 2:
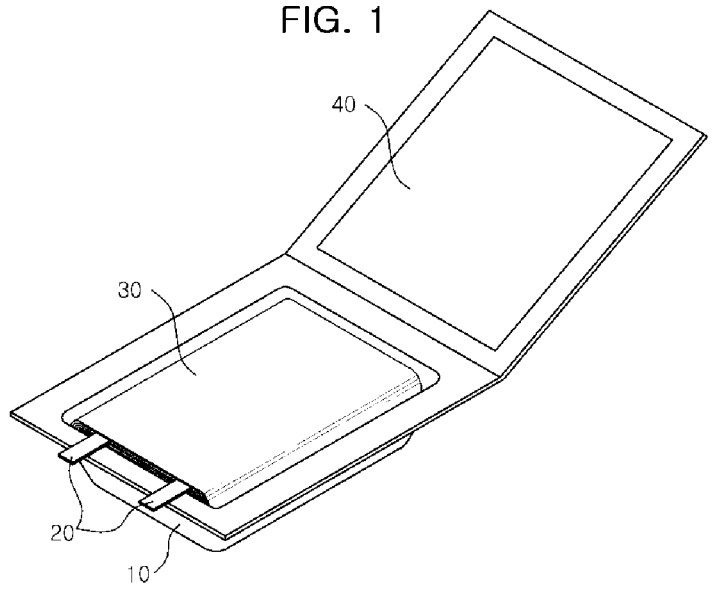
Figure 3:
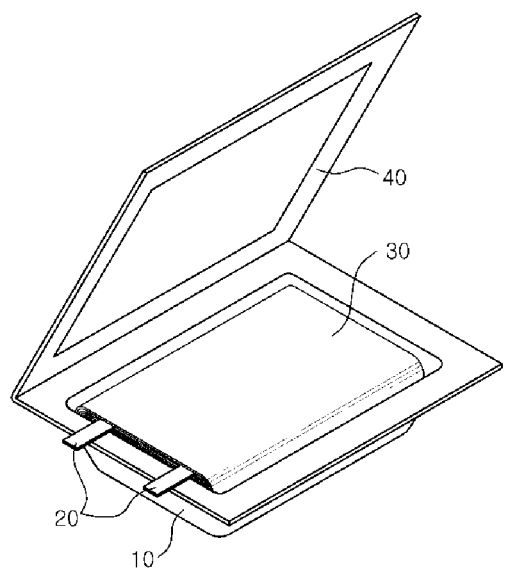
Figure 4:
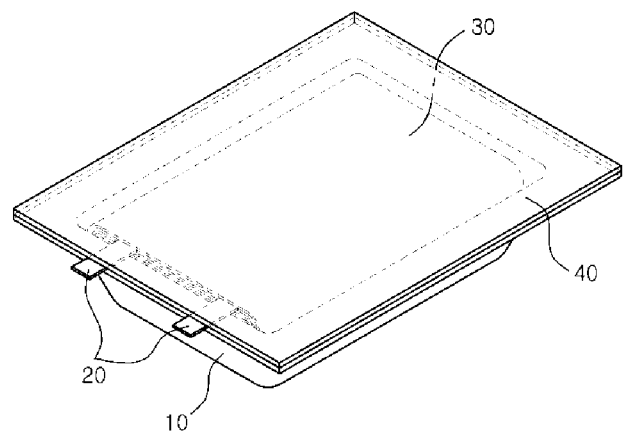
FIG. 4 is a perspective view of the general pouch type secondary battery.

Hereinafter, exemplary embodiments of the present disclosure will now be described in detail with reference to the accompanying drawings. Exemplary embodiments of the present disclosure may, however, be exemplified in many different forms and should not be construed as being limited to the specific embodiments set forth herein. In the drawings, the shapes and dimensions of elements may be exaggerated for clarity, and the same reference numerals will be used throughout to designate the same or like elements.

Figure 5:
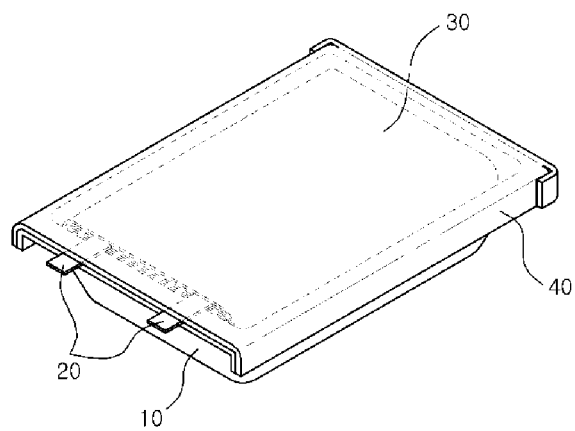
FIG. 5 is a perspective view of a pouch type secondary battery in which a sealing part is folded downwardly at an angle of 90 degrees, according to an exemplary embodiment of the present disclosure.
Figure 6:
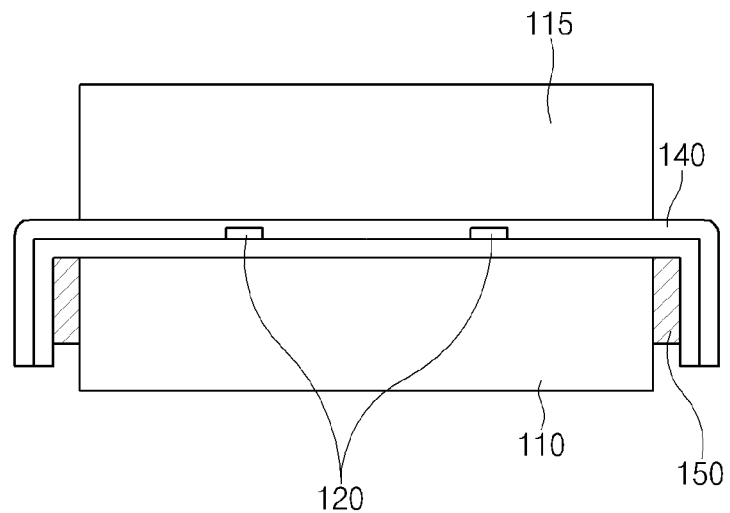
FIG. 6 is a front elevational view of a pouch type secondary battery in which a sealing part is folded downwardly at an angle of 90 degrees, according to another exemplary embodiment of the present disclosure.
Figure 7:
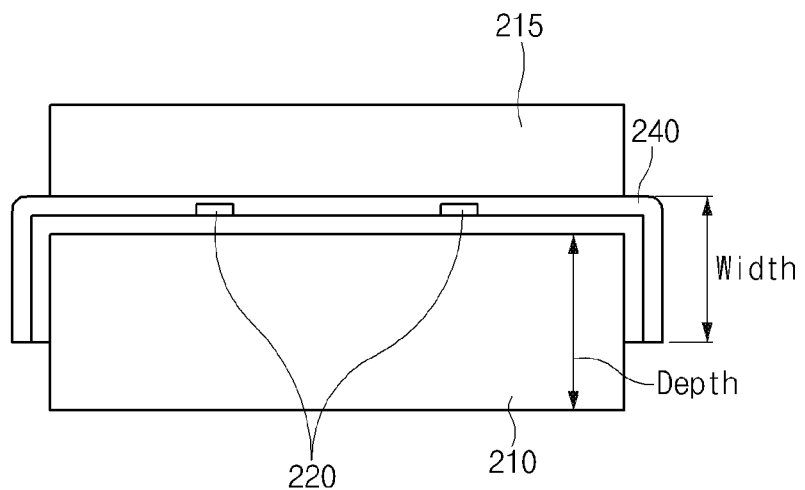
FIG. 7 is a front elevational view of a pouch type secondary battery in which a sealing part is folded downwardly at an angle of 90 degrees, according to another exemplary embodiment of the present disclosure.

FIGS. 1 through 4 are schematic views of a general pouch type secondary battery, and FIGS. 5 through 7 are schematic views of respective pouch type secondary batteries in which a sealing part is folded downwardly at an angle of 90 degrees, according to exemplary embodiments of the present disclosure.

An exemplary embodiment of the present disclosure is intended to provide a pouch type secondary battery in which a sealing part is folded downwardly at an angle of 90 degrees.

Referring to FIGS. 1 through 5, in general, a pouch type secondary battery may include an electrode assembly 30 having a stack structure of an anode/a separation film/a cathode; a pouch type exterior member configured of a lower surface in which a receiving part 10 is formed and an upper surface 40 covering the receiving part 10, a single electrode assembly or a plurality of electrode assemblies being received in the receiving part 10; and electrode terminals 20 formed outwardly of the exterior member. In this case, the pouch type secondary battery may include a sealing part formed by bonding edges of the pouch type exterior member. As illustrated in FIG. 5, portions of the sealing part formed on surfaces of the pouch type exterior member on which the electrode terminals 20 are not formed outwardly of the exterior member are folded downwardly at an angle of 90 degrees, and the folded portions of the sealing part are in a fixed state, such that a defect in which an end portion of the pouch comes into contact with a cooling fin within a module, thereby being insulated therefrom, may be prevented.

In this case, a width of the sealing part may be equal to or less than a thickness of the secondary battery. In a case in which the width of the sealing part is greater than the thickness of the secondary battery, the sealing part may be partially provided outside of the thickness of the secondary battery and occupy a relatively large amount of space.

Materials for the anode, the cathode, and the separation film are not particularly limited, and as long as the materials are commonly used in the technical field, they may be used in exemplary embodiments of the present disclosure without particular limitation.

For example, the cathode may be formed by coating a negative active material such as a lithium metal, a lithium alloy, carbon, petroleum coke, activated carbon, graphite or the like on opposite surfaces of a negative current collector fabricated using copper, nickel, an copper alloy or a combination thereof, but materials for the cathode are not limited thereto. In addition, the anode may be formed by coating a positive active material such as a lithium manganese oxide, a lithium cobalt oxide, a lithium nickel oxide, or the like on opposite surfaces of a positive current collector fabricated using aluminum, nickel, or a combination thereof.

Meanwhile, the separation film may be a multilayer film having, for example, a microporous structure and fabricated using polyethylene, polypropylene, or a combination thereof, or may be a polymer film for solid polymer electrolytes or gel type polymer electrolytes, such as polyvinylidene fluoride, polyethylene oxide, polyacrylonitrile or a copolymer of polyvinlylidene fluoride and hexafluoropropylene.

The secondary battery according to the exemplary embodiment of the present disclosure may be obtained by embedding the electrode assembly in the pouch type exterior member and injecting an electrolyte therein. A concrete method for fabricating a secondary battery by embedding the electrode assembly in the pouch type exterior member is not particularly limited, and a method commonly used in the technical field may be appropriately applied to the present disclosure.

In this case, the pouch type exterior member may have a shape corresponding to that of the electrode assembly, but is not particularly limited. For example, as shown in FIG. 6, the pouch type exterior member may have receiving parts 115, 110 formed in the upper surface 140 and lower surface thereof, respectively, in order to embed the electrode assembly in the pouch type exterior member, a single electrode assembly or a plurality of electrode assemblies being received in the receiving parts.

In this case, as shown in FIG. 6, the upper and lower surfaces of the pouch type exterior member may be symmetrical with respect to each other. The width of the sealing part may be equal to or less than, half of the thickness of the secondary battery. In a case in which the width of the sealing part is greater than half of the thickness of the secondary battery, the sealing part may be partially provided outside of the thickness of the secondary battery at the time of folding the sealing part and may occupy a relatively large amount of space.

In addition, as shown in FIG. 7, the receiving parts 215, 210 formed in the upper surface 240 and lower surface, respectively, of the pouch type exterior member may be asymmetrical with respect to each other. In this case, the width (labeled in FIG. 7) of the sealing part may be equal to or less than a depth (labeled in FIG. 7) of the receiving part 210 formed in a surface in which the depth of the receiving part is greater than that of the remaining receiving part 215 formed in another surface, from among the upper surface and the lower surface of the pouch type exterior member. In a case in which the width of the sealing part is greater than a depth of the receiving part formed in a surface in which the depth of the receiving part is greater than that of the remaining receiving part formed in another surface, from among the upper surface and the lower surface of the pouch type exterior member, the sealing part may be partially provided outside of the thickness of the secondary battery at the time of folding the sealing part and may occupy a relatively large amount of space.

In this case, the sealing part may be folded at an angle of 90 degrees in a direction toward a surface in which the depth (labeled in FIG. 7) of the receiving part 210 is greater than that of the remaining receiving part 215 formed in another surface, from among the upper surface and the lower surface of the pouch type exterior member. In a case in which the sealing part is folded in a direction toward a surface in which the depth of the receiving part is less than that of the remaining receiving part formed in another surface, from among the upper surface and the lower surface of the pouch type exterior member, the sealing part may be partially provided outside of the thickness of the secondary battery at the time of folding the sealing part and may occupy a relatively large amount of space.

The folded portion of the sealing part as described above may not maintain a folded state thereof due to tension of the sealing part itself and may be spaced apart from the exterior member. Accordingly, as shown in FIG. 6, the folded portion of the sealing part may be fixed to one surface of the pouch type exterior member as needed. Elements provided for the fixation are not particularly limited, and the fixation may be performed through various methods such heat fusion, adhesion using insulating tape 150, and the like.

Meanwhile, the pouch type exterior member may be formed of laminated sheets and in this case, the laminated sheets may be formed of an external resin layer forming an outermost portion, a metal barrier layer preventing a substance from penetrating therethrough, and an internal resin layer provided for sealing, but they are not limited thereto.

Furthermore, an electrode lead may be outwardly exposed from the pouch type exterior member in order to electrically connect the electrode terminals of electrode assemblies of secondary batteries. Although not illustrated, an insulating film may be adhered to upper and lower surfaces of the electrode lead in order to protect the electrode lead.

A material for the insulating tape according to the exemplary embodiment of the present disclosure is not particularly limited, as long as it may have electrical insulating properties. For example, an outermost portion of the insulating tape may be formed of a polyolefin polymer, a polyester polymer, and a nylon substance. Furthermore, as a material for the insulating tape may be formed and used by coating the substances as described above on another base member.

Meanwhile, the secondary battery is not limited to, but may be a lithium ion battery or a lithium ion polymer battery, for example.

The secondary battery obtained by the method according to the exemplary embodiment of the present disclosure as described above may be used alone and may be used in the form of a battery pack including two or more secondary batteries. The secondary battery and/or the secondary battery pack according to the exemplary embodiment of the present disclosure may be usefully used in various devices, for example, cellular phones, portable computers, smartphones, smart pads, net book computers, light electric vehicles (LEVs), electric vehicles (EVs), hybrid electric vehicles (HEVs), plug-in hybrid electric vehicles (PHEVs), power storage devices and the like.

REFERENCE NUMERAL 10, 110, 115, 210, 215: receiving part
20, 120, 220: electrode terminals
30: electrode assembly
40, 140, 240: upper surface of a pouch type exterior member
150: insulating tape.

The invention claimed is:

1. A secondary battery including an electrode assembly having a stack structure of an anode/a separation film/a cathode, a pouch type exterior member configured of a lower surface in which a lower receiving part is formed and an upper surface covering the lower receiving part, the electrode assembly or a plurality thereof being received in the lower receiving part, and an electrode terminal formed outwardly of the pouch type exterior member, the secondary battery comprising:
   sealing parts formed by bonding edges of the pouch type exterior member, wherein a portion of at least one of the sealing parts formed on a surface of the pouch type exterior member on which the electrode terminal is not formed outwardly of the exterior member is folded downwardly to form a folded portion of the sealing part,
   wherein at least a part of the folded portion is fixed to one surface of the pouch type exterior member,
   wherein the pouch type exterior member has an upper receiving part formed in the upper surface thereof,
   wherein the upper receiving part and the lower receiving part are asymmetrical with respect to each other such that a depth of the upper receiving part is different than a depth of the lower receiving part, and
   wherein a portion of the sealing parts formed on a surface of the pouch type exterior member on which the electrode terminal is formed outwardly of the exterior member is not folded downwardly.

2. The secondary battery of claim 1, wherein at least a part of the folded portion of the sealing part is adhered to a side surface of the secondary battery.

3. The secondary battery of claim 1, wherein the entire folded portion of the sealing part is adhered to a side surface of the secondary battery.

4. The secondary battery of claim 1, wherein a width of the folded portion is equal to or less than a thickness of the secondary battery.

5. The secondary battery of claim 1, wherein a width of the folded portion is equal to or less than half of a thickness of the secondary battery.

6. The secondary battery of claim 1, wherein the secondary battery is a lithium secondary battery.

7. The secondary battery of claim 1, wherein the folded portion is fixed to the one surface of the pouch type exterior member by heat fusion.

8. The secondary battery of claim 1, wherein the folded portion is fixed to the one surface of the pouch type exterior member by insulating tape.

9. The secondary battery of claim 8, wherein an outermost portion of the insulating tape is formed of a material selected from among a polyolefin polymer, a polyester polymer, and nylon.

10. The secondary battery of claim 1, wherein a width of the folded portion is equal to or less than the greater of the depth of the upper receiving part and the depth of the lower receiving part.

11. The secondary battery of claim 10, wherein the portion of the sealing part is folded in a direction toward the one of the upper surface and the lower surface having the receiving part of greater depth.

12. A battery pack comprising two or more secondary batteries of claim 1.

13. A device comprising at least one secondary battery of claim 1.

14. The device of claim 13, wherein the device is a cellular phone, a portable computer, a smartphone, a smart pad, a net book computer, a light electric vehicle (LEV), an electric vehicle (EV), a hybrid electric vehicle (HEV), a plug-in hybrid electric vehicle (PHEV), or a power storage device.

* * * * *